(12) United States Patent
Villar et al.

(10) Patent No.: US 9,323,221 B2
(45) Date of Patent: Apr. 26, 2016

(54) OVERMOULDED TIMEPIECE WHEEL

(71) Applicant: ETA SA MANUFACTURE HORLOGERE SUISSE, Grenchen (CH)

(72) Inventors: Ivan Villar, Bienne (CH); Laurent Kaelin, Sonvilier (CH); Xavier Tinguely, Fontaines (CH)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 0 days.

(21) Appl. No.: 14/365,363

(22) PCT Filed: Nov. 23, 2012

(86) PCT No.: PCT/EP2012/073499
§ 371 (c)(1),
(2) Date: Jun. 13, 2014

(87) PCT Pub. No.: WO2013/087398
PCT Pub. Date: Jun. 20, 2013

(65) Prior Publication Data
US 2014/0328149 A1    Nov. 6, 2014

(30) Foreign Application Priority Data

Dec. 16, 2011    (EP) .................................. 11194064

(51) Int. Cl.
*G04B 31/00*    (2006.01)
*G04B 35/00*    (2006.01)
*G04B 29/00*    (2006.01)

(Continued)

(52) U.S. Cl.
CPC ............ *G04B 15/14* (2013.01); *B29C 45/1459* (2013.01); *B29D 15/00* (2013.01); *G04B 13/00* (2013.01); *G04B 13/02* (2013.01); *G04B 13/026* (2013.01); *B29C 2791/002* (2013.01); *B29C 2945/00* (2013.01); *B29K 2715/00* (2013.01); *B29L 2015/006* (2013.01)

(58) Field of Classification Search
CPC ...... G04B 13/00; G04B 13/02; G04B 13/026; G04B 15/14
USPC .......................... 368/124, 125, 127, 322, 323
See application file for complete search history.

(56) References Cited

U.S. PATENT DOCUMENTS 3,425,212 A * 2/1969 Verde ........................... 368/129
3,590,574 A    7/1971 Wittner
(Continued)

FOREIGN PATENT DOCUMENTS

CH        546 971 A       3/1974
CH     699680 A2 *        4/2010
(Continued)

*Primary Examiner* — Amy Cohen Johnson
*Assistant Examiner* — Daniel Wicklund
(74) *Attorney, Agent, or Firm* — Sughrue Mion, PLLC

(57) ABSTRACT

A timepiece wheel overmolded onto an arbor. The wheel is plastic injection overmolded onto a washer fitted onto the arbor. This washer has a lower density than the arbor. This washer includes at least one plane surface forming a bearing and sealing surface for cooperating in a sealed manner with an injection mold for the overmolding operation. The timepiece wheel may be an escape wheel whose teeth are formed during overmolding onto the arbor and the washer, and it includes an escape pinion mounted and abutted to the washer or integral with the washer.

13 Claims, 2 Drawing Sheets

(51) Int. Cl.
*G04B 15/00* (2006.01)
*G04B 15/14* (2006.01)
*G04B 13/02* (2006.01)
*B29C 45/14* (2006.01)
*B29D 15/00* (2006.01)
*G04B 13/00* (2006.01)
*B29L 15/00* (2006.01)

(56) References Cited

U.S. PATENT DOCUMENTS 3,620,005 A * 11/1971 Ganter et al. ............... 368/129
3,930,362 A     1/1976 Cielaszyk
3,942,848 A *  3/1976 Voumard ..................... 384/125
4,318,017 A *  3/1982 Migeon et al. ........... 310/156.16
4,785,434 A * 11/1988 Shoji et al. ................... 368/185
7,633,837 B2 * 12/2009 Daout ........................... 368/220
2002/0141292 A1* 10/2002 Bettelini et al. ............. 368/323
2011/0103197 A1*  5/2011 Buhler et al. ................ 368/177
2011/0310709 A1* 12/2011 Vaucher et al. ............. 368/132

FOREIGN PATENT DOCUMENTS

EP        0 369 704 A2    5/1990
FR        2 020 572 A1    7/1970

* cited by examiner

OVERMOULDED TIMEPIECE WHEEL

CROSS REFERENCE TO RELATED APPLICATIONS

This application is a National Stage of International Application No. PCT/EP2012/073499 filed Nov. 23, 2012, claiming priority based on European Patent Application No. 11194064.9, filed Dec. 16, 2011, the contents of all of which are incorporated herein by reference in their entirety.

FIELD OF THE INVENTION

The invention concerns a timepiece wheel overmoulded onto an arbor having a pivot axis, by plastic injection overmoulding onto a metal washer fitted onto said arbor, said washer having a lower density than that of said arbor, said injected plastic material forming a peripheral overmoulded area carrying a toothing of said wheel.

The invention also concerns a timepiece escapement mechanism.

The invention concerns a timepiece movement.

The invention also concerns a timepiece.

The invention also concerns a method of manufacturing an overmoulded timepiece wheel.

The invention concerns the field of horology, and more particularly the field of pivotally mounted oscillating components, capable of being made by plastic injection overmoulding onto a metal frame.

BACKGROUND OF THE INVENTION

The utilisation of overmoulded timepiece components is often advantageous in terms of reduced production costs for large scale manufacturing. Further, the inertia of the components is lower than that of metal components with the same geometry, which is favourable for the overall efficiency of the movement. Overmoulding is generally used for wheels or wheel sets, on and around a metal arbor having one or more shoulders which are left clear to cooperate with pivots or suchlike.

However, the plastic materials chosen for their tribological qualities and for their adherence to their metal frame, most usually an arbor, have the drawback of creep/expansion. This causes problems of serviceability, and leads to a loss of geometry of the toothing(s) of the wheels or pinions manufactured in this manner.

EP Patent Application No 0369704A2 in the name of SHIOJIRI KOGYO discloses a stepped arbor with a one-piece flange, and a plastic toothing at the periphery of the arbor and notably moulded thereon. FR Patent Application No 2020572A1 in the name of WITTNER discloses a metronome escapement wheel moulded in one piece of plastic material with a barrel and its wheel, and particularly onto a notched groove of an arbor. U.S. Pat. No. 3,930,362A in the name of CIELASZYK discloses a wheel whose plate and toothing are made of plastic material overmoulded onto an arbor, to the right of a groove therein.

SUMMARY OF THE INVENTION

The invention proposes to improve the serviceability and precision of overmoulded timepiece wheels.

The invention therefore concerns a timepiece wheel overmoulded onto an arbour having a pivot axis, by plastic injection overmoulding onto a metal washer fitted onto said arbour, said washer having a lower density than that of said arbour, said injected plastic material forming a peripheral overmoulded area carrying a toothing of said wheel, characterized in that said washer has a spring type profile, and includes elastic arms performing a damping function for said peripheral toothing.

According to a feature of the invention, said washer includes at least one plane surface forming a bearing and sealing surface to cooperate in a sealed manner with an injection mould for the overmoulding operation.

According to a feature of the invention, said timepiece wheel includes a pinion coaxially mounted to said arbour or integral therewith.

The invention also concerns a timepiece escapement mechanism including at least one overmoulded escape wheel of this type.

The invention also concerns a timepiece movement including at least one overmoulded timepiece wheel of this type, and/or a timepiece escapement including at least one overmoulded escape wheel of this type.

The invention also concerns a timepiece including at least one overmoulded timepiece wheel of this type, and/or a timepiece escapement mechanism including at least one overmoulded escape wheel of this type.

The invention further concerns a method of manufacturing an overmoulded timepiece wheel, characterized in that the following steps are performed:
- an arbour is prepared for incorporation into said wheel, either by manufacturing the arbour with a shoulder forming a flange including at least one plane bearing and sealing surface, or by fitting a metal washer including at least one plane bearing surface onto said arbour;
- said arbour thus prepared is placed in an injection mould including a complementary bearing and sealing surface arranged to cooperate in a sealed manner with said bearing and sealing surface;
- a plastic overmoulding material for said arbour is injected into said mould.

BRIEF DESCRIPTION OF THE DRAWINGS

Other features and advantages of the invention will appear upon reading the following detailed description, with reference to the annexed Figures, in which.

DETAILED DESCRIPTION OF PREFERRED EMBODIMENTS

Figure 1:
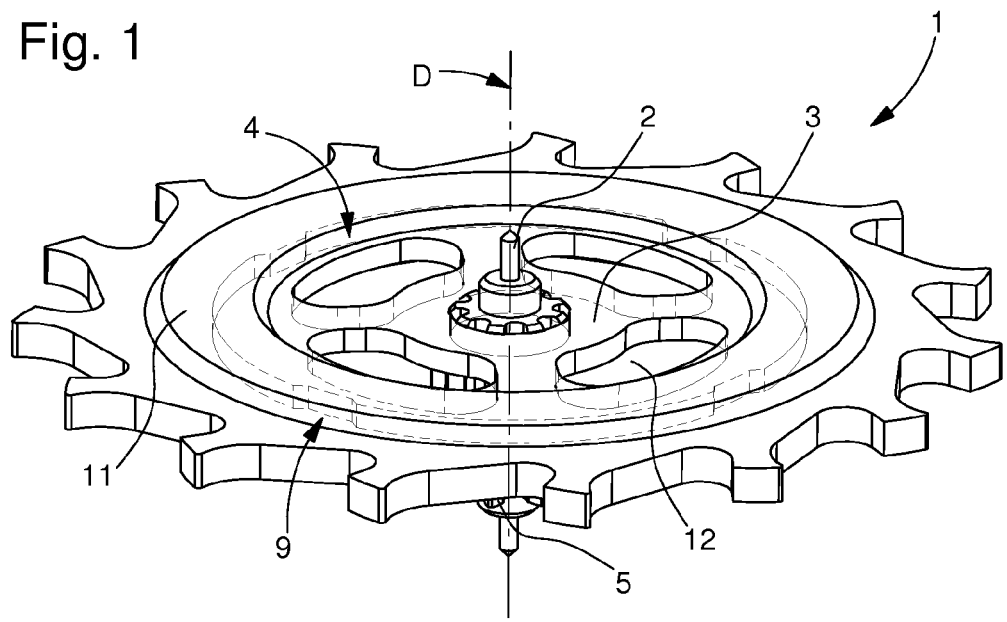
FIG. 1 shows a schematic, perspective, transparent view of an overmoulded timepiece wheel in a particular embodiment in the form of an escape wheel including an escape pinion.
Figure 2:
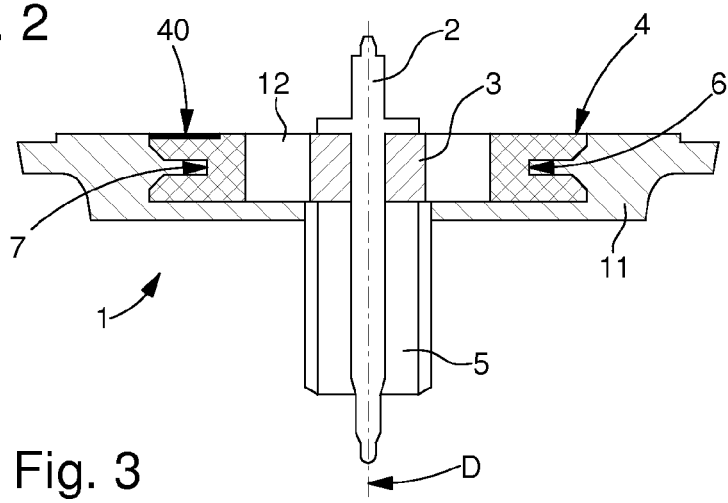
FIG. 2 shows a schematic cross-section of the wheel of FIG. 1, according to a plane through the pivot axis of the wheel, with a first washer variant.
Figure 3:
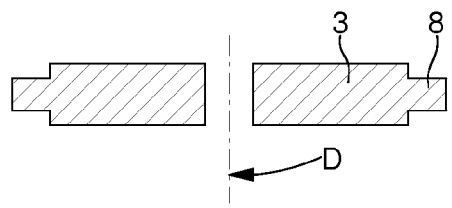
FIG. 3 shows a schematic cross-section according to a plane through its pivot axis of another washer variant incorporated in the wheel.
Figure 4:
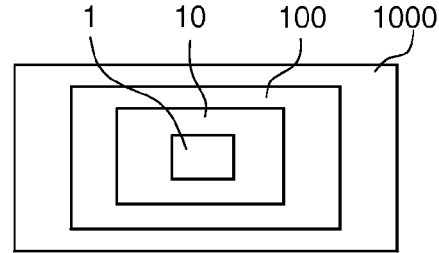
FIG. 4 shows block diagrams of a timepiece including a movement which in turn includes an escapement mechanism with an escape wheel according to the invention.

The invention concerns the field of horology, and more particularly the field of pivotally mounted oscillating components, capable of plastic injection overmoulding onto a metal frame.

The invention more particularly proposes to make a wheel, which has very low sensitivity to temperature and maintains its stability and precision despite expansions. Preferably, the invention endeavours to limit deformations due to expansions in the operating area of the wheel, namely its crown.

The invention more particularly concerns a timepiece wheel 1 overmoulded onto an arbour 2 having a pivot axis D.

According to the invention, this overmoulded timepiece wheel 1 is plastic injection overmoulded onto a preferably metal washer 3, fitted onto arbour 2 or integral therewith. The plastic injection concerns the peripheral area, and therefore the crown of the wheel, which ensures lower sensitivity to any expansion.

Specifically, according to the invention, wheel 1 is a wheel with reduced inertia, and the material of washer 3 is therefore of different and preferably lower density to that of arbour 2. The use of a washer 3 made of a light aluminium or similar alloy very substantially reduces the inertia of the wheel, in comparison to a wheel overmoulded onto a steel arbour including a support flange also made of steel. Preferably, the inertia of washer 3 is lower than that of arbour 2.

The injected plastic material forms a peripheral overmoulded area 11 carrying a toothing 13 of wheel 1. Preferably, the inertia of peripheral area 11 is lower than that of arbour 2. If possible, the inertia of peripheral area 11 is lower than that of washer 3.

Figure 5:
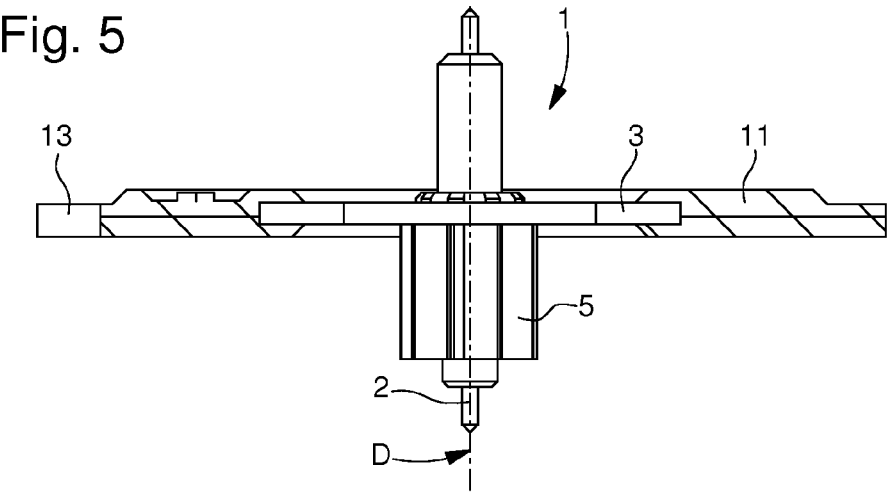
FIG. 5 shows, in a similar manner to FIG. 2, a wheel variant wherein the overmoulded area is confined to the periphery of the wheel, surrounding a washer, but without any contact with an arbour on which the washer is mounted.

As seen in FIG. 5, which constitutes a preferred variant of the invention, this peripheral overmoulded area 11 is at the periphery of wheel 1, remote from arbour 2 and has no contact with arbour 2, consequently there are no tensions causing stress in the toothing.

In the case of a wheel forming part of an escapement mechanism, particularly an escape wheel, the low inertia, and especially the very low variation in inertia with temperature, are favourable for regularity of operation, which is an important advantage of the invention.

As regards production costs, the saving of material achieved is substantial, and it is possible to use a simple bar for arbour 2, with precision machining required only for the pivots, and a cut or stamped washer for washer 3.

Figure 6:
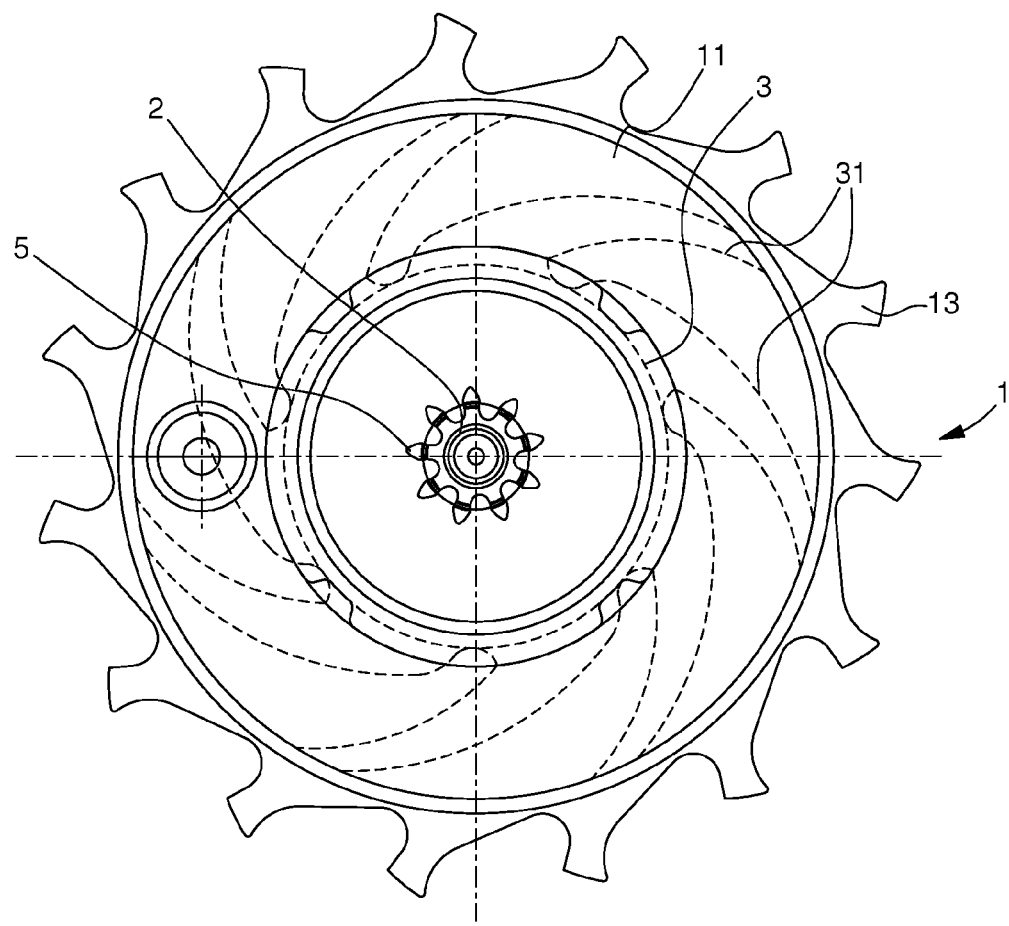
FIG. 6 shows a plan view of a wheel according to the invention, including a cut washer with arms forming damping springs.

In an advantageous variant, washer 3 is not circular but has a spring type profile, and includes, for example, elastic, particularly curved arms 31, performing a damping function for the peripheral toothing, as seen in FIG. 6.

In a particular embodiment, washer 3 includes at least one plane surface 4 forming a bearing and sealing surface 40 for cooperating in a sealed manner with an injection mould for the overmoulding operation.

In the embodiment in the form of a timepiece wheel set, overmoulded timepiece wheel 1 includes at least one pinion 5 coaxially mounted to said arbour 2 or integral with arbour 2, either through the manufacture of said arbour 2, or by fixedly securing by adhesive bonding, brazing, welding, deformation, keying, screws, driving in or other means.

Advantageously, the toothing of pinion 5 traverses the entire length of pinion 5, which allows the entire exposed portion of the pinion to be used, and the height of movements to be reduced.

Preferably, pinion 5 is mounted in abutment on washer 3 or is integral with washer 3.

It is desired to obtain low inertia when choosing an overmoulded wheel. Washer 3 is therefore advantageously pierced with holes or apertures 12 to reduce the inertia thereof in relation to axis D.

Preferably, the diameter of washer 3 is greater than half the largest diameter of wheel 1, which is located on a peripheral plastic portion 11.

To ensure that overmoulded portion 11 remains securely held on the metal frame and in particular on washer 3, the washer includes at least a first peripheral projecting or recessed profile 6, or a groove 7 of revolution about axis D or a shoulder 8 of revolution about axis D, to axially immobilise the overmoulded plastic material after the overmoulding operation. Advantageously, washer 3 includes at least a second projecting or recessed peripheral profile 9 for angularly immobilising the overmoulded plastic material after the overmoulding operation. These two peripheral profiles 6 and 9 may be combined, as in the example of FIG. 1.

In a particular advantageous embodiment, illustrated in the Figures, overmoulded timepiece wheel 1 is an escape wheel whose teeth are formed during the overmoulding on arbour 2 and on washer 3, and it includes an escape pinion mounted in abutment on washer 3 or integral with washer 3.

The invention also concerns a timepiece escapement mechanism 10 including at least one overmoulded escape wheel 1 of this type.

The invention concerns a timepiece movement 100 including at least one overmoulded timepiece wheel 1 of this type and/or a timepiece escapement mechanism 10 of this type including at least one overmoulded escape wheel 1 of this type.

The invention also concerns a timepiece 1000 including at least one overmoulded timepiece wheel 1 of this type and/or an escapement mechanism 10 including at least one overmoulded escape wheel 1 of this type.

The invention also concerns a method of manufacturing an overmoulded timepiece wheel 1. According to the invention, the following steps are performed:

- an arbour 2 is prepared for incorporation into wheel 1, either by manufacturing the arbour with a shoulder forming a flange including at least one plane bearing and sealing surface 40, or by fitting a metal washer 3 including at least one plane bearing surface 4 onto arbour 2;
- the arbour thus prepared is placed in an injection mould including a complementary bearing and sealing surface arranged to cooperate in a sealed manner with said bearing and sealing surface 40;
- a plastic material is injection overmoulded onto the arbour inside the mould, remote from the arbour;

In a variant implementation of this method, during preparation of arbour 2, the arbour is made with a pinion 5 or a pinion 5 is added, fitted onto arbour 2 in abutment on washer 3 and, during overmoulding in the mould, a portion of pinion 5 is immobilised by the plastic material used for overmoulding.

In short, the introduction of a rigid, intermediate, preferably metal washer minimises the effect of creep/expansion. The invention may of course implement a non-metal washer, provided that it is of significantly higher rigidity than that of the overmoulded plastic material. The use of a silicon or quartz washer 3 is particularly advantageous because of the low inertia of the material and its great elasticity, especially where washer 3 has damping arms 31. It is noted that damping means other than arms, such as slots, pouches or other means may be used without departing from the invention.

The use of a washer with a plane bearing surface facilitates sealing in the injection mould. Indeed, when a wheel set is made with a pinion whose toothing develops over the entire length of the pinion, in the absence of a plane bearing surface, sealing would have to be achieved through the pinion toothing, which is virtually impossible.

The wheel according to the invention has very stable behaviour with temperature: very low deformation, low inertia and very little variation in inertia. This wheel remains accurate and does not disrupt operation.

The invention claimed is:

1. A timepiece wheel overmoulded onto a steel arbor having a pivot axis, by plastic injection overmoulding onto a metal washer fitted onto said arbor, said washer having a lower density than that of said arbor, said injected plastic material forming a peripheral overmoulded area carrying a toothing of said wheel,
   wherein said washer comprises elastic arms performing a damping function for said peripheral toothing,
   wherein the wheel comprises at least one pinion coaxially mounted and fixedly secured to said arbor,
   wherein said pinion is mounted in abutment on said washer or is integral with said washer,
   wherein said washer further comprises at least a first peripheral projecting or recessed profile, or a groove of revolution about said axis or a shoulder of revolution about said axis, configured to axially immobilise the overmoulded plastic material after the overmoulding operation, and/or in that said washer comprises at least a second peripheral projecting or recessed profile configured to angularly immobilise the overmoulded plastic material after the overmoulding operation, and
   wherein a portion of said pinion is immobilised by the plastic material used for overmoulding.

2. The overmoulded timepiece wheel according to claim 1, wherein said overmoulded peripheral area is remote from said arbor and has no contact therewith.

3. The overmoulded timepiece wheel according to claim 1, wherein the toothing of said pinion has the same length as that of said pinion according to the direction of the axis of rotation of said pinion.

4. The overmoulded timepiece wheel according to claim 1, wherein said washer is pierced with holes to reduce the inertia thereof in relation to said axis.

5. The overmoulded timepiece wheel according to claim 1, wherein said washer comprises at least one plane surface forming a bearing and sealing surface for cooperating in a sealed manner with an injection mould for the overmoulding operation.

6. The overmoulded timepiece wheel according to claim 1, wherein the diameter of said washer is greater than half the largest diameter of said wheel.

7. The overmoulded timepiece wheel according to claim 1, wherein the inertia of said washer is lower than that of said arbor.

8. The overmoulded timepiece wheel according to claim 1, wherein said injected plastic material forms a peripheral overmoulded area carrying a toothing of said wheel and in that the inertia of said peripheral area is lower than that of said arbor.

9. The overmoulded timepiece wheel according to claim 1, wherein the wheel is an escape wheel whose teeth are formed during overmoulding onto said arbor and said washer, and in that the wheel comprises an escape pinion mounted in abutment on said washer or integral with said washer.

10. A timepiece escapement mechanism comprising at least one overmoulded timepiece wheel according to claim 1.

11. A timepiece movement comprising at least one overmoulded timepiece wheel according to claim 1, and/or a timepiece escapement mechanism comprising at least one overmoulded timepiece wheel according to claim 1.

12. A timepiece comprising at least one overmoulded timepiece wheel according to claim 1, and/or a timepiece escapement mechanism comprising at least one overmoulded timepiece wheel according to claim 1.

13. A method of manufacturing an overmoulded timepiece wheel, the method comprising:
   preparing an arbor for incorporation into said wheel, by fitting a metal washer comprising at least one plane bearing surface onto said arbor, said washer being of lower density that that of said arbor and comprising elastic arms performing a damping function;
   fitting a pinion onto said arbor in abutment on said washer;
   placing said prepared arbor in an injection mould comprising a complementary bearing and sealing surface arranged to cooperate in a sealed manner with said plane bearing surface forming a bearing and sealing surface;
   injecting a plastic overmoulding material for said arbor is injected into said mould remote from said arbor, and
   immobilising, during overmoulding in said mould, a portion of said pinion by the plastic material used for overmoulding.

* * * * *